United States Patent [19]

Winner

[11] Patent Number: 4,961,331

[45] Date of Patent: Oct. 9, 1990

[54] VEHICLE SECURITY SYSTEM WITH IMPROVED STEERING WHEEL

[76] Inventor: James E. Winner, 32 W. State St., Sharon, Pa. 16146

[21] Appl. No.: 330,051

[22] Filed: Mar. 29, 1989

[51] Int. Cl.[5] .................... B60R 25/02; E05B 13/10
[52] U.S. Cl. ...................................... 70/209; 70/238; 70/417; 74/552; 74/558
[58] Field of Search ............... 74/558, 552; 70/207, 70/209, 238, 416, 417

[56] References Cited

U.S. PATENT DOCUMENTS

| | | | |
|---|---|---|---|
| 475,305 | 5/1892 | Follett | 74/552 |
| 1,044,387 | 11/1912 | Hodge | 74/552 |
| 1,142,780 | 6/1915 | Younger | 74/552 |
| 1,168,146 | 1/1916 | Barnes | 74/558 |
| 2,491,609 | 12/1949 | George | 74/552 |
| 2,662,961 | 12/1953 | Sargent | 74/552 |
| 3,274,851 | 9/1966 | Geller | 74/552 |
| 4,166,400 | 9/1979 | Manning et al. | 74/552 |
| 4,186,576 | 2/1980 | Means et al. | 70/233 |
| 4,327,601 | 5/1982 | Vivian, Jr. | 74/552 |
| 4,800,775 | 1/1989 | Iuchi | 74/552 |

FOREIGN PATENT DOCUMENTS

| | | | |
|---|---|---|---|
| 191555 | 1/1923 | United Kingdom | 74/558 |
| 537665 | 7/1941 | United Kingdom | 74/552 |
| 1107012 | 3/1968 | United Kingdom | 70/238 |
| 1135192 | 12/1968 | United Kingdom | 70/417 |

*Primary Examiner*—Lloyd A. Gall
*Attorney, Agent, or Firm*—Body, Vickers & Daniels

[57] ABSTRACT

A motor vehicle security system prevents unauthorized removal of a foot pedal-steering wheel lock by means of structural reinforcement of the steering wheel to prevent destructive severing of the wheel rim which would enable removal of the lock. A cut-resistant steel cable is embedded in the steering wheel rim to enhance the resistance of the wheel to severing.

6 Claims, 3 Drawing Sheets

VEHICLE SECURITY SYSTEM WITH IMPROVED STEERING WHEEL

The present invention pertains generally to vehicle security systems, and particularly to a vehicle security system which prevents unauthorized operation and theft of the vehicle by means of constraining the steering wheel from rotation. "The invention is specifically applicable to an improved steering wheel construction which prevents severing of mechanical, anti-theft devices secured thereto to thus provide a totally effective anti-theft vehicle security system."

BACKGROUND OF THE INVENTION

Vehicle security systems are known to include electronic devices such as alarms and so called "killer switches" which directly disable the engine or ignition unless bypassed by an authorized operator with a special key or an electronic code, as well as mechanical devices such as steering wheel locks which inhibit unauthorized operation of the vehicle by constraining the steering wheel against rotation when locked into position. However, all these vehicle security systems suffer from numerous disadvantages in terms of cost, convenience and effectiveness.

Electronic alarms for motor vehicles have become well known in recent years, and so have the disadvantages associated with their use. Such alarms are specifically adapted to be highly sensitive to physical force or motion in order to sound-off when the vehicle is disturbed in any way. Consequently, such alarms are frequently activated accidentally by persons such as parking lot or service station attendants, passengers seeking entry to the vehicle, or the owners themselves who neglect to attend to the alarm upon entry of the vehicle. Furthermore, electronic alarms seem to be prone to malfunction, as most motorists have on occasion encountered a vehicle with an alarm sounding for no apparent reason.

So called "killer switches" have also become well known in recent years. These switches serve to disable the vehicle, usually at the ignition system, unless a special key or electronic code is employed to override the switch. In addition to being costly and suffering from the usual reliability problems associated with electronic devices carried on a motor vehicle, this type of security system is easily bypassed by a knowledgeable thief. Furthermore, the typical motorist is less knowledgeable regarding electronic systems and may be prevented from operating the vehicle in an emergency if the system malfunctions, or if the proper means of bypassing the system is forgotten or not known by family members or others who need to operate the vehicle.

Vehicle security systems also include mechanical anti-theft devices which restrain relative movement between the operating controls at the interior of the vehicle. Such mechanical locks comprise a pair of hooks at opposite ends of an elongated locking apparatus which is adjustable in length so that one hook can be engaged on a foot pedal and the other positioned around the steering wheel rim. The elongated apparatus is then contracted in length and locked into position to provide a rigid and tight connection between the foot pedal and the steering wheel, whereby neither of those vehicle control components can be moved relative to the other as required for operation of the vehicle. These mechanical locks provide vehicle security without the cost and complexity of electronic security systems, and further provide the convenience of being usable selectively at the discretion of the motorist as opposed to being an ever present fixture of the vehicle which must inconveniently be attended to every time the vehicle is operated.

Nevertheless, mechanical locks extending between the steering wheel and a foot pedal suffer from a serious shortcoming which substantially inhibits their effectiveness as anti-theft devices. The hooks and locks are usually composed of hardened steel to resist removal by bending or prying, and most importantly to resist cutting with a hacksaw or clipping with an oversized bolt cutter. While the locks themselves are thereby inherently resistant to destruction and removal by a thief, they fail to provide an effective overall vehicle security system since a thief may merely cut or clip the steering wheel rim to provide a severed break through which the lock hook may be removed from its secured position. Unlike severing of the foot pedal bar, severing of the steering wheel rim would barely inhibit operation of the vehicle by a thief, and likewise would barely detract from the value of the stolen vehicle.

The prior art is thus seen to fail to provide a vehicle security system which is economical, simple, and convenient to use, and yet which is thoroughly effective in preventing theft of a vehicle.

SUMMARY OF THE INVENTION

The present invention overcomes the above described disadvantages and others and provides a vehicle security system which is inexpensive, convenient, and effective in preventing theft of a motor vehicle. In accordance of a principal feature of the invention, a steering wheel is provided with reinforcement adapted to effectively resist severing of the steering wheel rim. This enables the steering wheel to co-operate with a foot pedal-steering wheel lock in providing a theft resistant mechanical security system which cannot be destructively severed for unauthorized removal of the lock. Specifically, the reinforcement is preferred to take the form of a steel cable embedded in the steering wheel rim. In this form the invention can be provided as a factory installed component of a new vehicle or as a component of a replacement steering wheel purchased in an automotive parts store. In either case, the embedded steel cable is an unobtrusive security device which requires absolutely no maintenance or other attention by the driver.

In accordance with a more specific feature of the invention, there is provided a steering wheel comprising a rim partially adjoined by a spoke or spokes, and reinforcement means at least at the sections of the rim not adjoined by the spokes to provide those sections with an enhanced degree of resistance to severing. Since a severed break in the rim to pass a lock hook would most likely be sought at a section of the rim which is not adjoined by a spoke, the invention advantageously provides anti-theft security to the steering wheel at the portions most likely to be vandalized by a thief.

In accordance with another specific feature of the invention, a steering wheel rim of standard construction including a non-metallic hoop with a circular internal metal support ring is provided with a reinforcing steel cable to resist severing. Steering wheel rims are normally composed of plastic or other non-metalic material, and are structurally supported in a circular shape by an internal metal supporting ring. Since a steering wheel should yield under the impact of a driver accidentally thrust against the wheel, the internal metal supporting ring is formed to be flexible in a direction parallel to the steering wheel shaft, but these flexible pieces of metal provide little resistance to clipping with a bolt cutter or cutting with a hacksaw. This is particularly true when the internal supporting ring is formed as a thin, flat piece. On the other hand, a steel cable can be both flexible and resistant to cutting, whereby the invention advantageously provides enhanced resistance to severing of the steering wheel rim without detracting from the flexible safety of the wheel.

In accordance with yet another specific feature of the invention, the internal steel cable is adapted to provide circular structural support to the steering wheel rim as well as to provide resistance to severing and flexibility under impact. This feature of the invention enables the steering wheel to be constructed without the conventional internal supporting ring described above.

The principal object of the present invention is to provide an improved vehicle security system which is reliable and effective in preventing theft of a motor vehicle.

Another object of the invention is to provide a vehicle security system which is economical and convenient to use.

Yet another object of the invention is to provide a vehicle security system which enables a steering wheel to resist vandalism and removal of a lock attached thereto.

Still another object of the present invention is to provide a vehicle security system which enables a steering wheel to cooperate with a lock extending between the steering wheel and a foot pedal to enhance the anti-theft security of the lock.

A further object of the invention is to provide a vehicle security system which prevents unauthorized removal of a lock engaged between the steering wheel and the foot pedals of the vehicle.

These and other objects of the inventions will become apparent from the following description of the preferred embodiments thereof taken together with the accompanying drawings.

DESCRIPTION OF THE PREFERRED EMBODIMENTS

Figure 1:
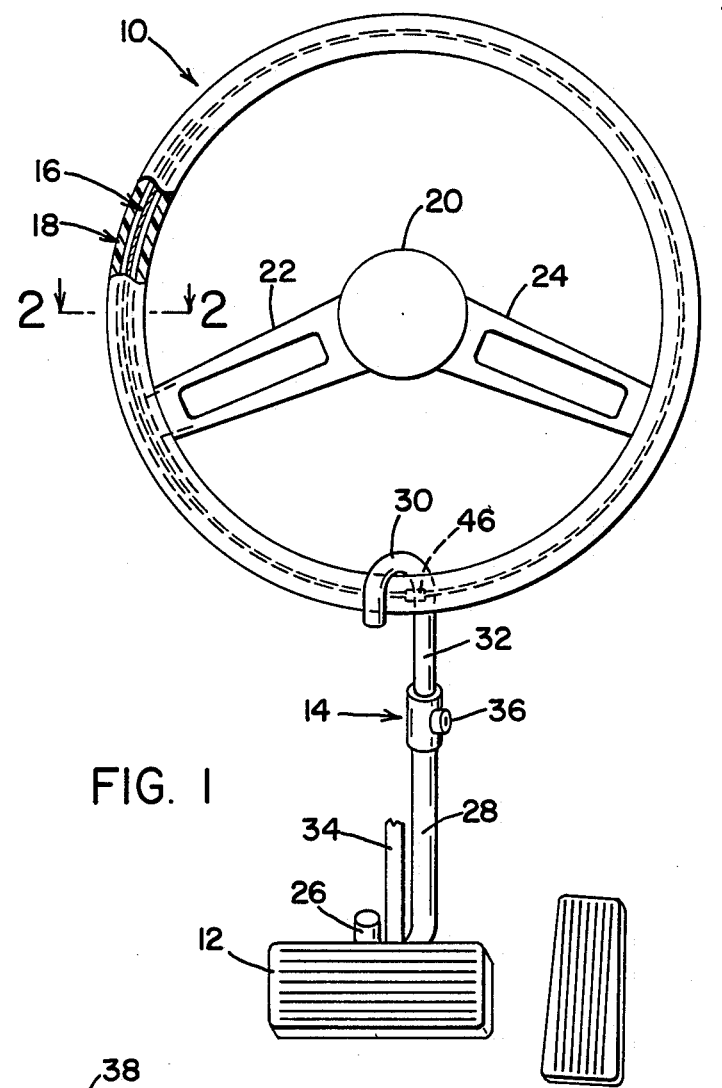
FIG. 1 is a pictorial view, partly in section, of a vehicle security system in accordance with the present invention.

Referring now to the drawings wherein the showings are made for the purpose of illustrating the preferred embodiments of the invention and not for the purpose of limiting same, in FIG. 1 there is shown a steering wheel 10 rigidly connected to a brake pedal 12 by means of a lock 14. The lock 14 is adapted to prevent complete rotation of the steering wheel 10 and thereby to prevent unauthorized operation of the vehicle while the lock 14 is in place, and the steering wheel 10 is adapted by means of a steel cable 16 to resist severing at the rim 18 which would otherwise permit removal of the lock 14 from the secured position engaged with the steering wheel 10.

More specifically, the steering wheel 10 includes a hub 20 connected to the rim 18 by a pair of spokes 22 and 24. The lock 14 comprises a first hook 26 carried on a first tubular member 28, and a second hook 30 carried on a second tubular member 32 which is telescopically shiftable within the first tubular member 28. The lock 14 is installed by placing the first hook 26 around the brake pedal arm 34 and by shifting the second tubular member 32 telescopically into the first tubular member 28 to bring the second hook 30 into position against the wheel rim 18 wherein it is securely held by use of an integrally formed key lock 36. Complete rotation of the steering wheel 10 is thereby prevented as the second hook 30 blocks passage of either of the spokes 22 and 24 past the hooked position in line with the brake pedal arm 34.

Figure 2:
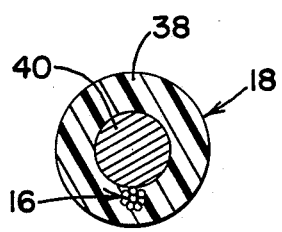
FIG. 2 is an enlarged crossed sectional view taken along line 2—2 of FIG. 1.
Figure 3:
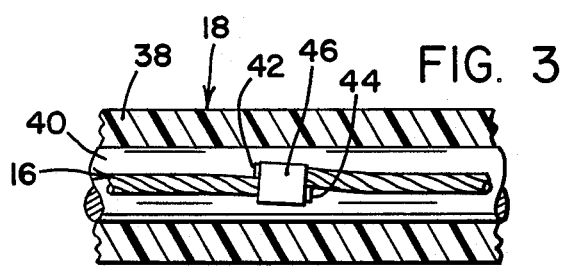
FIG. 3 is a partial sectional view of a steering wheel rim in accordance with a specific feature of the invention.

In accordance with the invention and as shown specifically in FIGS. 2 and 3, the steering wheel rim 18 comprises an outer hoop 38 formed of plastic, fiberglass, or other non-metallic material, an internal metal supporting member 40 which is adapted to support the rim 18 in a circular shape but also to flexibly yield under a forceful impact, and a flexible steel cable 16 extending circumferentially around the wheel rim 18 in a loop between opposite ends 42 and 44 which are joined by a clamp 46. The twisted strand structure of the steel cable 16 is sufficiently flexible so as not to interfere with the safety features of the steering wheel 10, and the strands, which may be metallurgically hardened, provide resistance to severing greatly in excess of that provided only by the homogeneous cross section of the flexible internal supporting member 40. Consequently, the invention advantageously provides a steering wheel which is secure against destructive vandalism which would lead to theft of the vehicle, and in conjunction with an appropriate steering wheel lock provides an effective vehicle security system comprising the lock and the steering wheel itself.

Figure 1A:
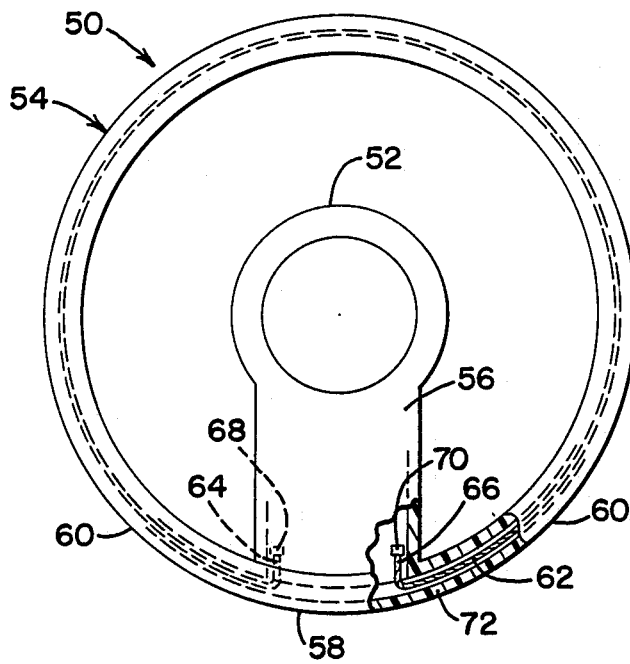
FIG. 1A is a front elevational view, partly in section, of a vehicle steering wheel in accordance with an alternate embodiment of the present invention.

Referring now to FIG. 1A, there is shown an alternate embodiment of the invention specifically adapted for a steering wheel 50 having a hub 52, a rim 54, and a single enlarged spoke 56 defining an adjoining rim section 58 and a non-adjoining rim section 60. A cut resistant embedded flexible steel cable 62 extends around the non-adjoining section 60 of the rim 54 between two opposite ends 64 and 66. A pair of anchors 68 and 70 are provided at the ends 64 and 66 of the cable 62, respectively, to prevent withdrawal of the cable 62 out of the wheel 50 through a break in the non-metalic outer material 72. Since severing of the rim 54 at the section 58 adjoining the spoke 56 would not provide an open break in the rim 54 through which a lock hook could be removed, the steel cable 62 is efficiently provided only at the non-adjoining rim section 60 which is susceptible to severing for removal of a lock hook.

Figure 4:
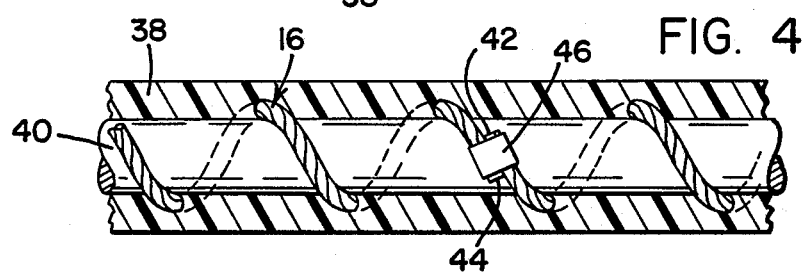
FIG. 4 is a partial sectional view of a steering wheel rim in accordance with another alternate embodiment of the invention.
Figure 5:
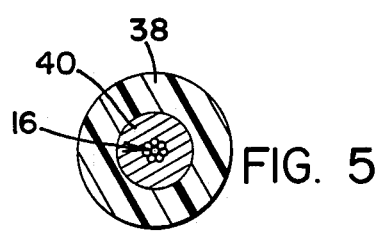
FIGS. 5–8 are cross sectional views of steering wheel rims in accordance with further alternate embodiments of the invention.
Figure 6:
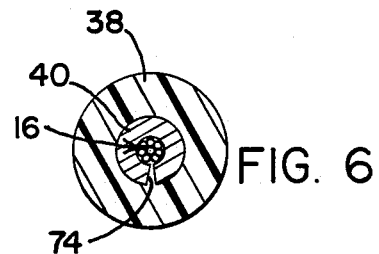
Figure 7:
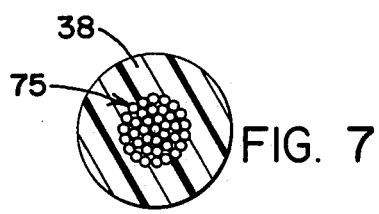
Figure 8:
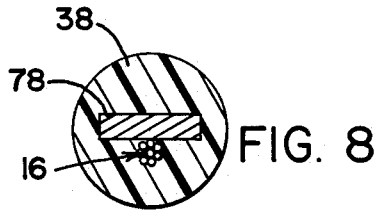

In FIGS. 4 through 8 there are shown additional alternate embodiments of the invention which vary with respect to placement of the cut resistance steel cable relative to the flexible internal supporting member of the steering wheel. The steel cable 16 can be wound about the internal supporting member 40 as shown in FIG. 4; can be embedded within the internal supporting member 40 as shown in FIG. 5; or can be inserted within a slot 74 formed in the internal supporting member 40 as shown in FIG. 6. In FIG. 7 there is shown a flexible steel cable 75 having a relatively larger cross section and a relatively greater number of strands in order to possess a greater degree of rigidity and thereby to serve both as a circular structural supporting member and a cut resistant reinforcing member, and in FIG. 8 there is shown the steel cable 16 in association with an internal supporting member 78 having a flattened cross sectional shape.

Figure 9:
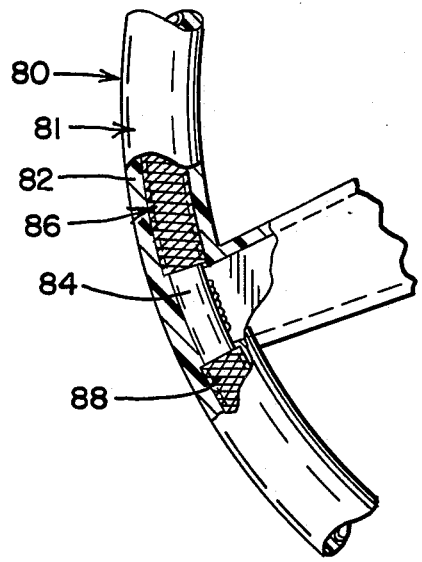
FIG. 9 is a partial front view, partly in section, of a steering wheel in accordance with yet a further alternate embodiment of the present invention.
Figure 10:
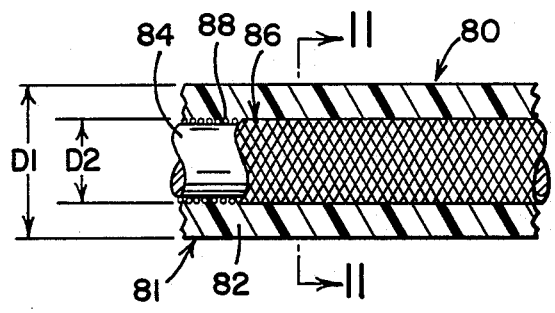
FIG. 10 is a partial sectional view of a steering wheel rim in accordance with the embodiment of the invention shown in FIG. 9.
Figure 11:
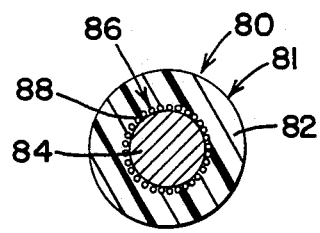
FIG. 11 is a crossed sectional view taken along line 11—11 of FIG. 10.

Referring now to FIG. 9, there is shown yet another alternate embodiment of the invention wherein a steering wheel 80 with a rim 81 comprising a non-metallic outer hoop 82 and a flexible internal circular supporting member 84 is provided with a cut resistant steel reinforcing member 86 in the form of strands 88 disposed in a woven pattern around the internal supporting member 84. The woven configuration of the steel strands 88 provides the steering wheel 80 with a greater degree of resistance to severing, as a hacksaw moving across the outside diameter D1 of the wheel rim 81 will encounter the strands 88 continuously across the outside diameter D2 of the cut resistant steel reinforcing member 86.

Figure 12:
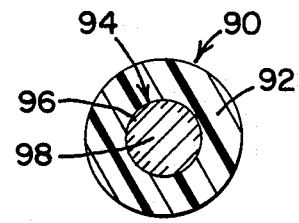
FIG. 12 is a cross sectional view of a steering wheel in accordance with yet another alternate embodiment of the present invention.

Yet another embodiment of the invention is shown in FIG. 12 wherein a steering wheel rim 90 includes a non-metallic hoop 92 and a cut resistant steel reinforcing member 94 in the form of a solid steel bar. The steel bar 94 is metallurgically hardened at the surface region 96 to resist cutting, as may be accomplished by induction heating and quench hardening, but is unhardened at the inner region 98 in order to retain overall flexibility.

The invention has been described with reference to the preferred embodiments. It will be appreciated that modifications or alterations which would not deviate from the present invention will occur to others upon their reading and understanding of this specification. It is intended that all such modifications and alterations be included insofar as they come within the scope of the appended claims or the equivalents thereof.

Having thus described the invention, it is claimed;

1. In a vehicle security system of the type which utilizes a mechanical anti-theft locking device, secured, at least in part, to the steering wheel rim of the vehicle's steering wheel, the improvement comprising:
   a steering wheel and steering wheel rim including a non-metallic outer hoop containing a circular metal support ring and means for reinforcing said steering wheel against destructive severing, said reinforcing means including a steel cable embedded in said non-metallic outer hoop, said steel cable being disposed in a helical configuration wrapped around said metal support ring.

2. An improved vehicular steering wheel especially adapted for use in a vehicle security system of the type which employs a mechanical, anti-theft device secured to a portion of the steering wheel rim of said steering wheel, said steering wheel comprising:
   a non-metallic, form sustaining curved steering wheel rim, a metal support ring embedded in said rim for strengthening said rim in a yieldable, flexible manner, at least one spoke having one end secured to sad metal support ring and an opposite end secured to a radially inwardly positioned hub of said steering wheel, said metal support ring having an adjoining section secured to said one end of said spoke and a non-adjoining metal support ring section defined to include that section of said metal support ring adjacent to and unattached to said one spoke end, and means adjacent to and in contact with said non-adjoining metal support ring section to provide said non-adjoining support ring section with an enhanced degree of resistance to severing while not adversely affecting the flexibility of said steering wheel rim, said means including flexible steel strands positioned in circumferentially extending continuous contact along said non-adjoining metal support ring section.

3. The vehicular security system of claim 2 wherein said means includes a plurality of strands of steel cable positioned within and extending along said metal support ring.

4. A vehicular security system as defined in claim 2 wherein said means includes a steel cable wrapped around and along said non-adjoining metal support ring section.

5. The vehicular security system of claim 4 wherein said cable has opposite free ends and anchor means embedded in said spoke for anchoring the ends of said steel cable.

6. An improved vehicular steering wheel especially adapted for use in a vehicle security system of the type which employs a mechanical, anti-theft device secured to a portion of the steering wheel rim of said steering wheel, said steering wheel comprising:
   a non-metallic, form sustaining curved steering wheel rim, a metal support ring embedded in said rim for strengthening said rim in a yieldable, flexible manner, at least one spoke having one end secured to said metal support ring and an opposite end secured to a radially inwardly positioned hub of said steering wheel, said metal support ring having an adjoining section secured to said one end of said spoke and a non-adjoining metal support ring section defined to include that section of said metal support ring adjacent and unattached to said one spoke end, and means adjacent to and in contact with said non-adjoining metal support ring section to provide said non-adjoining support ring section with an enhanced degree of resistance to severing while not adversely affecting the flexibility of said steering wheel rim, said means including flexible steel strands positioned in circumferentially extending continuous contact along said non-adjoining metal support ring section and specifically including a plurality of steel strands woven into a mesh, said mesh wrapped about said non-adjoining metal support ring section.

* * * * *